United States Patent [19]
Park

[11] Patent Number: 5,910,693
[45] Date of Patent: Jun. 8, 1999

[54] SCANNER MOTOR COUPLED WITH A POLYGON MIRROR

[75] Inventor: Sang Hwan Park, Kyunggi-do, Rep. of Korea

[73] Assignee: Samsung Electro-Mechanics Co., Ltd., Suwon, Rep. of Korea

[21] Appl. No.: 08/976,548

[22] Filed: Nov. 24, 1997

[30] Foreign Application Priority Data

Apr. 29, 1997 [KR] Rep. of Korea ................. 97-9062 U

[51] Int. Cl.$^6$ .............................. H02K 7/00; H02K 5/16; H02K 5/00
[52] U.S. Cl. ............................ 310/67 R; 310/90; 310/89
[58] Field of Search ................................. 310/67 R, 90, 310/156, 88, 89, 91, 261, 262, 267

[56] References Cited

U.S. PATENT DOCUMENTS 5,325,006  6/1994  Uno et al. ................................. 310/90

*Primary Examiner*—Nestor Ramirez
*Assistant Examiner*—Dang Dinh Le
*Attorney, Agent, or Firm*—Ladas & Parry

[57] ABSTRACT

A scanner motor coupled with a polygon mirror is improved for coupling the polygon mirror to a housing via a push fit while a pressive pushing force is absorbed into the housing without being imposed upon the polygon mirror, and further for decreasing the number of parts and deleting manufacturing process and man-hour to enhance productivity and economize cost. The scanner motor includes a stator assembly placed to a lower portion of the scanner motor and fixed to a plate having a prescribed inner diameter in the center portion thereof, a cylinder part erectly installed upward in the hole at the center of the plate, a motor shaft extending to be longer than an upper end of the cylinder part and erectly installed to the center of the cylinder part by interposing a bearing, a housing having a lower side portion being a reference plane to be placed with the polygon mirror and an upper side portion erectly installed to the upper portion of the lower side portion for being inserted into the upper outer periphery of the motor shaft, a fitting portion erectly installed to the housing to be thin and be formed with a hollowed groove along the outer periphery of the upper side portion by being spaced apart therefrom, and the polygon mirror push-fitted into the outer periphery of the fitting portion with a pressive pushing tolerance, so that the polygon mirror is fixed via the push fit without requiring separate fixing means.

9 Claims, 2 Drawing Sheets

SCANNER MOTOR COUPLED WITH A POLYGON MIRROR

BACKGROUND OF THE INVENTION

1. Field of the Invention

The present invention relates to a scanner motor coupled with a polygon mirror employed for a laser beam printer, and more particularly to a structural improvement of coupling a housing fixedly installed to an upper end of a motor shaft with a polygon mirror coupled to the housing.

2. Description of the Prior Art

Generally, a laser beam printer employs an optical scanning device which is provided with a rotating polygon mirror, and it is a scanner motor to rotate the polygon mirror.

The scanner motor is for widely reflecting the light emitted from a laser diode toward a photosensitive drum. Since the above-stated polygon mirror demands high rotating precision, it is necessary to maintain the highly stable rotating state thereof. Furthermore, the polygon mirror itself should not be pressurized to thus require a particular coupling structure.

The scanner motor is typically formed by, as shown in FIG. 1, a plate 1 fixed with a stator assembly 2 wound with coils, a cylinder 3 provided by being inserted into a hole formed in the center of plate 1. A motor shaft 5 is erectly formed by interposing a bearing 4 at the center of cylinder 3, and a housing 6 is coupled to the upper end of motor shaft S. Additionally, a rotor case 7 is separately joined to the lower end of housing 6, and a polygon mirror 8 is inserted into the upper end of housing 6 to be coupled thereto.

In the conventional scanner motor constructed as above, once an electric power is applied to stator assembly 2, a magnetic force is incited by the interaction with a magnetic body installed into the inside of rotor case 7 which is in turn rotated at high speed by centering about motor shaft 5. During this operation, polygon mirror 8 becomes rotated to deflect beams which scan toward polygon mirror 8 by a constant angle of view.

In order to prevent the deviation of polygon mirror 8, the foregoing conventional motor employs an elastic clamp 9 as shown in FIG. 1. That is, elastic clamp 9 is for pressing the upper plane of polygon mirror 8 with its radially-split edge end 9a in such a manner that the center portion of elastic clamp 9 is inserted into the upper end of motor shaft 5 to confine polygon mirror 8 by means of a screw 91 coupled into the upper end plane of motor shaft 5.

The reason for using elastic clamp 9 is that housing 6 and polygon mirror 8 are loosely fitted to each other so as not to transfer the pressing force upon polygon mirror 8. Accordingly, elastic clamp 9 is utilized to press the upper portion of polygon mirror 8 to inhibit the deviation of the loosely-fitted polygon mirror 8 during the rotating motion.

However, in the above-described conventional coupling structure, elastic clamp 9 is necessarily required as well as screw 91 coupled into motor shaft 5 after inserting elastic clamp 9 into motor shaft 5. Furthermore, there is a problem of separately processing a female screw into motor shaft 5 for attaining the screw coupling. Therefore, the aforementioned conventional structure deleteriously involves many problems such as the increased number of parts, lengthened manufacturing process and man-hour, fastidious designing with respect to the coupling of the elastic clamp and raised cost.

In order to solve the above-stated problems, Japanese Patent Laid-Open Publication No. Hei 6-55113 has suggested a polygon mirror fixing structure. Here, a recess is formed into a reference plane of a rotating body which is fixed with the polygon mirror to be integrally rotated, and an adhesive is coated over the recess to fixedly adhering the polygon mirror to the rotating body. But, it has a drawback of degrading practicability because of difficulty in setting the hardening time and hardening temperature of the adhesive and restricted range of selecting the kind of adhesive.

SUMMARY OF THE INVENTION

Therefore, the present invention is devised to solve the foregoing problems. It is an object of the present invention to provide an improvement of a scanner motor coupled with a polygon mirror for coupling the polygon mirror to a housing via a push fit while a pressive pushing force is absorbed into the housing without being imposed upon the polygon mirror, and further for decreasing the number of parts and deleting manufacturing process and man-hour to enhance productivity and economize cost.

To achieve the above and other objects of the present invention, a scanner motor coupled with a polygon mirror is characterized by a stator assembly placed to a lower portion of the scanner motor and fixed to a plate having a prescribed inner diameter in the center portion thereof, a cylinder part erectly installed upward in the hole at the center of the plate, and a motor shaft extending to be longer than an upper end of the cylinder part and erectly installed to the center of the cylinder part by interposing a bearing. Also, a housing has a lower side portion being a reference plane to be placed with the polygon mirror and an upper side portion erectly installed to the upper portion of the lower side portion for being inserted into the upper outer periphery of the motor shaft, and a fitting portion is erectly installed to the housing to be thin and be formed with a hollowed groove along the outer periphery of the upper side portion by being spaced apart therefrom. The polygon mirror is push-fitted into the outer periphery of the fitting portion with a pressive pushing tolerance. By this construction, the polygon mirror is fixed via the push fit without requiring separate fixing means to attain a simplified structure.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
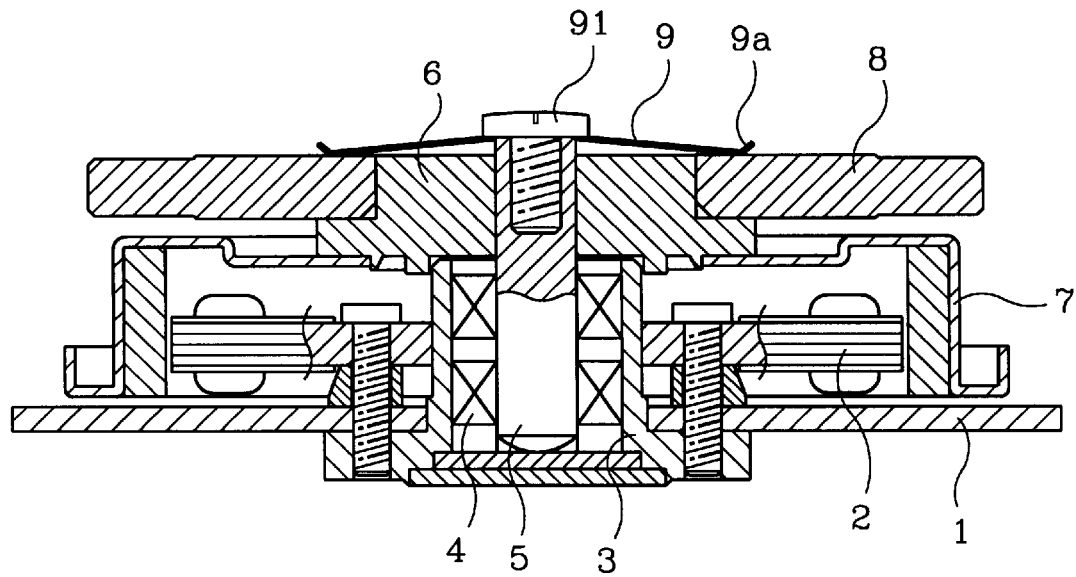
FIG. 1 is a sectional view showing a construction of a conventional scanner motor.
Figure 2:
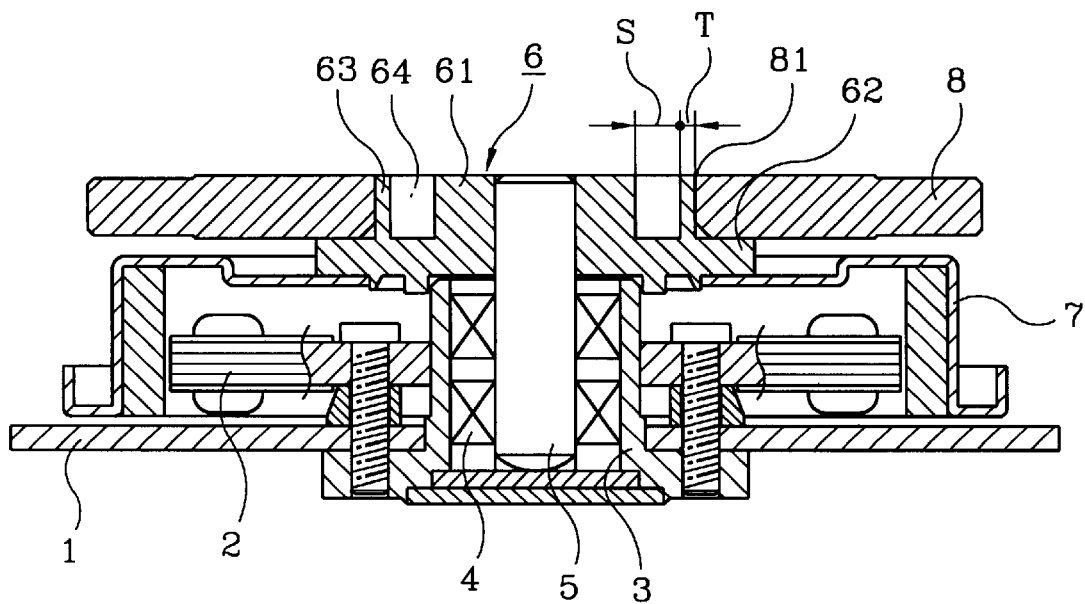
FIG. 2 is a sectional view showing a construction of a scanner motor according to the present invention.

FIG. 2 is a sectional view showing a scanner motor for optical scanning device according to the present invention, in which a plate 1 is fixed with a stator assembly 2 wound with coils, a cylinder 3 inserted into a hole formed in the center of plate 1 to be erectly installed thereto, and a motor shaft 5 erectly installed by interposing a bearing 4 at the center of cylinder 3. Also included as parts thereof are a housing 6 of which upper side portion 61 is coupled to the upper end of motor shaft 5, a rotor case 7 separately joined to a lower side portion 62 of housing 6 and a polygon mirror 8 coupled by being inserted into housing 6.

At this time, housing 6 becomes a reference plane for sustaining polygon mirror 8 by being equipped with lower side portion 62 provided to the lower side of upper side portion 61. Additionally, a hollowed groove 64 is formed along the outer periphery of upper side portion 61 to be formed with a fitting portion 63 having elasticity. Since fitting portion 63 is to have the elasticity as well as a stiffness enough to be push-fitted with polygon mirror 8 into its outer diameter, it should not be excessively thin. More preferably, an interval S of hollowed groove 64 is formed to be wider than a thickness B of fitting portion 63, and a depth H thereof equals to or is deeper than a thickness of polygon mirror 8 for sufficiently exerting the elasticity.

The operational status of the present invention constructed as above will be described below.

Figure 3:
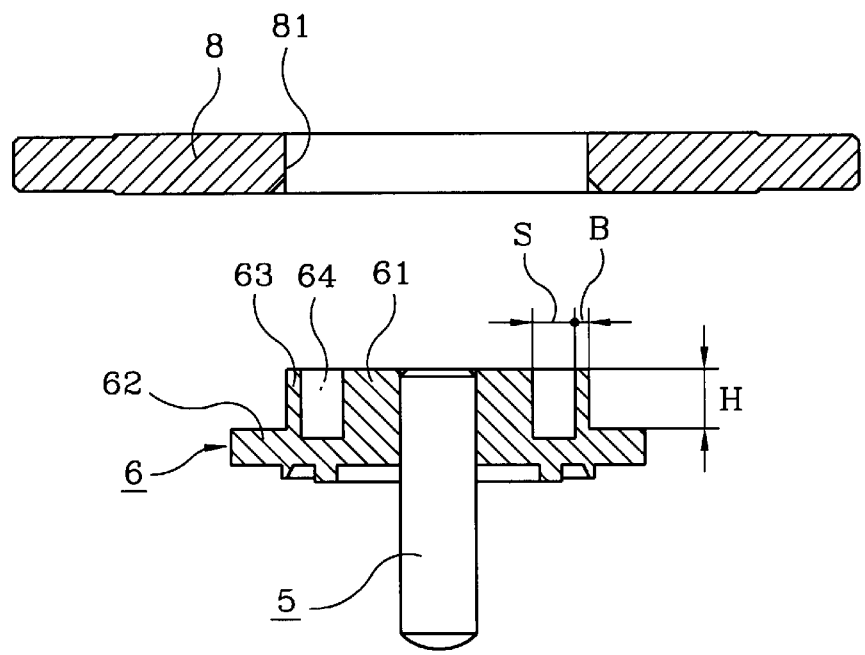
FIG. 3 is a sectional view showing an assembling state of the present invention.

As shown in FIG. 3, hollowed groove 64 is formed into the upper plane of housing 6 to secure fitting portion 63, and the outer diameter of housing 6 and an inner diameter 81 of polygon mirror 8 are processed to have the numerical values by the push fit tolerance. Then, by coupling housing 6 with polygon mirror 8, inner diameter 81 of polygon mirror 8 is tightly fitted into fitting portion 63 of housing 6. While fitting portion 63 is pushed inward to be coupled by the elastic deformation during performing the push fit process, polygon mirror 8 is not released out of housing 6. Once being coupled in this manner, fitting portion 63 is in the state of involving minute deformation inward. Under this state, the elasticity is incorporated due to maintaining the state that the outer diameter of fitting portion 63 is closely attached to inner diameter 81 of polygon mirror 8.

The pressive pushing force and sustaining capacity of fitting portion 63 during the coupled state may be differed in accordance with the kind of motor. At this time, it is possible to suitably design the motor in accordance with the width and depth of hollowed groove 64 and thickness T of fitting portion 63.

The pressive pushing tolerance resulting from the push fit of the outer diameter of fitting portion 63 and inner diameter 81 of polygon mirror 8 are described as follows. Here, it is assumed that the diameter $d_2$ of fitting portion 63 and that $d_1$ of inner diameter 81 have the relation that $d_2 > d_1$ prior to performing the push fit, and $d_2$ is changed into $d_1$ after performing the push fit to have the relation that $d_2 = d_1$.

Deformation quantity (length variation of radius) when $d_2$ becomes $d_1$:

$$\lambda = \pi(d_2 - d_1) \quad (1)$$

Deformation ratio of the length of radius:

$$\varepsilon = \frac{\pi(d_2 - d_1)}{\pi d_2} = \frac{d_2 - d_1}{d_2} \quad (2)$$

The resulting stress of radius under the given circumstance:

$$\sigma = E \cdot \varepsilon = \frac{E(d_2 - d_1)}{d_2} \quad (3)$$

where young's module E equals $2.8 \times 10^5$ kgf/cm².

Since a current not-go inertia moment of polygon mirror 8 is approximately 15 gf/cm², a fixing force in view of a frictional coefficient between polygon mirror 8 and housing 6 should be 15 gf and higher so as to integrally rotate polygon mirror 8 and housing 6 without involving any slippage.

In other words, fixing force F × frictional force $\mu \geq 15$ gf (where $\mu = 0.46$).
Consequently, $F \geq 32.6$ gf.

Providing that $$\sigma = \frac{F}{A}$$

(where $A = B \times H = 0.05 \times 0.3 = 0.015$ cm²) in equation (3), $$\sigma = E \frac{d_2 - d_1}{d_2} = \frac{F}{A}.$$

Therefore, $$F = A \cdot E d_2 - \frac{d_1}{d_1} \geq 32.6 \text{ g}$$

When $d_2$ is set by 2 cm, $$d_2 - d_1 \geq 1.55 \times 10^{-5} \text{ cm}$$

That is, when pressive pushing tolerance $d_2 - d_1$ becomes greater than $1.55 \times 10^{-5}$ cm (= 0.155 μm), the polygon mirror can be stably coupled to be integrally rotated with the housing.

Accordingly, in order to have the sufficient fixing strength, the pressive pushing tolerance that is at least more than 0.155 μm is required in the above-mentioned condition. But, when regarding the processing precision or assembling tolerance, the pressive pushing tolerance of more than 1 μm is needed. Also, there is a variation by the processing precision, and thus the proper tolerance is approximately 1 μm to 6 μm when considering the variation.

In the scanner motor according to the present invention as described in detail above, the polygon mirror is coupled to the housing of the rotor in such a manner that the coupling state can be maintained without employing the typically-needed elastic clamp and fixing screw. Furthermore, there is no need to form the screw hole in the motor shaft to make it possible to economize the number of parts and reduce manufacturing process.

Also, the pressive pushing force resulting from the push fit is absorbed by the fitting portion of the housing to have no concern of degrading the rotating accuracy of the polygon mirror while facilitating the design.

Figure 4:
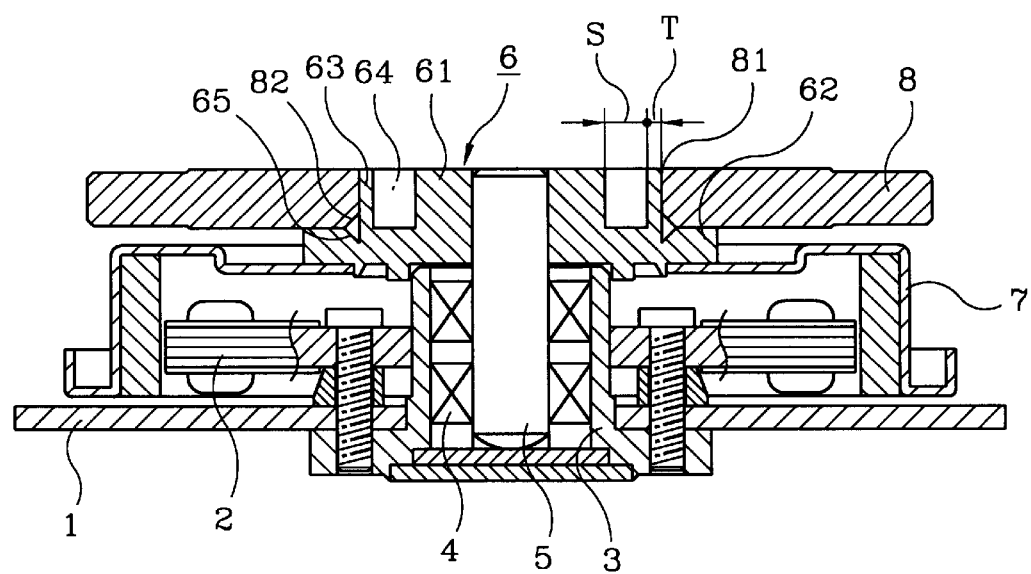
FIG. 4 is a sectional view showing another embodiment of the present invention.

FIG. 4 is a sectional view showing another embodiment of the scanner motor according to the present invention, in which the polygon mirror 8 is not interfered when being inserted into fitting portion 63 and the elasticity of fitting portion 63 is sufficiently exerted. More specifically, a recess groove 65 is formed along the lower end of the outer periphery of fitting portion 63, and a chamfer 82 is formed to the lower end of inner diameter 81 of polygon mirror 8. Consequently, when polygon mirror is push-fitted into fitting portion 63, the lower end of inner diameter 81 is not interfered with the lower end of the outer diameter of fitting portion 63, thereby leading polygon mirror 8 to be closely in contact with the surface of an abutment portion 62 which is the reference plane. Additionally, by push-fitting polygon mirror 8 into fitting portion 63, the elasticity of fitting portion 63 is sufficiently exerted by recess groove 65 to enhance the rotating accuracy of polygon mirror 8.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A scanner motor coupled with a polygon mirror comprising:

a plate having a hole in a center portion thereof;

a stator assembly placed to an upper portion of said plate;

a cylinder part inserted into said hole of said plate;

a motor shaft rotatably fixed in said cylinder part by a bearing;

a housing fixed on an upper portion of said motor shaft, and having a lower side portion having a first diameter and an upper side portion having a second diameter smaller than said first diameter of said lower side portion, said upper and lower portions being formed into one body;

a fitting portion as an outside wall portion formed to have a diameter smaller than a diameter of an outer periphery of said upper side portion of said housing, said fitting portion being open to the upside;

a polygon mirror coercively inserted into said outer periphery of said fitting portion.

2. A scanner motor coupled with a polygon mirror as claimed in claim 1, wherein a bottom depth of a hollow groove along said diameter of said outer periphery of said upper side portion is is at least as deep as a thickness of said polygon mirror.

3. A scanner motor coupled with a polygon mirror as claimed in claim 1, wherein a pressive pushing tolerance of said fitting portion and said polygon mirror is 1 to 6 micrometers.

4. A scanner motor coupled with a polygon mirror as claimed in claim 1, wherein a recess groove is formed in a lower end of said outer periphery of said fitting portion and toward said lower side portion of said housing.

5. A scanning motor comprising;

a plate with a hole in a portion thereof;

a stator assembly immovably adjacent a side of said plate;

a cylinder in said hole of said plate;

a motor shaft rotatably fixed in said cylinder;

a housing on said motor shaft and having a first side and a second side, said first side being oriented in a direction away from said stator assembly and having an inner portion and a fitting portion outside said inner portion, said inner portion having an outer periphery and said fitting portion having an inner periphery and an outer periphery, said fitting portion and said inner portion being distanced from each other by a groove with walls formed by said inner periphery of said fitting portion and said outer periphery of said inner portion; and a mirror having an inner periphery fitted against said outer periphery of said fitting portion.

6. A scanner motor according to claim 5, wherein said fitting portion is elastically deformable.

7. A scanner motor according to claim 5, wherein a depth of said groove is at least as deep as a thickness of said polygon mirror.

8. A scanner motor according to claim 5, wherein a fit between said outer periphery of said fitting portion and said inner periphery of said polygon mirror comprises a tolerance of 1 to 6 micrometers.

9. A scanner motor including a stator assembly, a rotor assembly rotatable relative to said stator assembly, and a housing rotatable with said rotor assembly and for accepting a mirror, the improvement comprising:

said housing having an inner portion surrounded by a fitting portion, and a groove between said inner portion and said fitting portion, said fitting portion having an outer periphery and an inner periphery distanced from an outer periphery of said inner portion by said groove; and a mirror having an inner periphery fitted against said outer periphery of said fitting portion.

* * * * *